Feb. 21, 1950

W. C. BARNES ET AL 2,497,855

FLAW DETECTING METHOD AND APPARATUS
FOR FERROMAGNETIC BODIES

Filed Jan. 17, 1944

INVENTORS
Walter C. Barnes, Henry W. Keevil
and John C. Dionne
BY
Mann, Brown & Co.
ATTYS.

INVENTORS
Walter C. Barnes, Henry W. Keevil
and John C. Dionne

Patented Feb. 21, 1950

2,497,855

UNITED STATES PATENT OFFICE 2,497,855

FLAW DETECTING METHOD AND APPARATUS FOR FERROMAGNETIC BODIES

Walter C. Barnes, Lake Bluff, Henry W. Keevil, Evanston, and John C. Dionne, Chicago, Ill.

Application January 17, 1944, Serial No. 518,538

22 Claims. (Cl. 175—183)

Our invention relates to the general method of flaw detection that is characterized by the steps of magnetizing a body such as a railroad rail to produce residual magnetism therein and subsequently exploring the body for characteristic magnetic conditions indicating structural flaws.

In all known flaw detection methods applicable to the railroad track, one of the greatest problems is to adequately distinguish between hazardous flaws and those rail defects which do not introduce danger into the operation of traffic over the track.

For lack of appropriate generic terms, we may conveniently refer to the hazardous flaws as fissure defects and the unimportant flaws as non-fissure defects. The first term is to be defined as referring primarily to fissures having transverse components since such fissures are always to be regarded as extremely dangerous whereas strictly longitudinal vertical splits of minor extent may not seriously lower the structural efficiency of a rail. Non-fissure defects include various minor irregularities such as wheel burns, surface scales, dents, corrugations, and minor laminations.

With reference to distinction between these two classes of flaws, it would be ideal to magnetize a rail in such a manner as to produce by residual magnetism local fields at all the locations of fissure defects without producing significant fields at non-fissure defects. In such an ideally magnetized rail, all indicated defects without exception would be of prime importance and there would be no need to distinguish one magnetic indication from another.

In practice, however, any practical method employed for longitudinally magnetizing a rail creates local external fields at non-fissure defects as well as at fissure defects. For example, a magnetizing method with regard to which our invention has special utility consists of moving one or more electromagnets along a rail, preferably with one pole of the electromagnet directed downwardly toward the upper surface of the rail. Inevitably the longitudinal flux applied to a rail by the moving electromagnet is of maximum density near the upper surface of the rail and tends therefore to create somewhat stronger residual magnetism at surface and near-surface defects than at defects deeper in the rail. Unfortunately, most of the troublesome non-fissure defects including burns, scales, dents, and corrugations are at, or close to, the surface of the rail and therefore may be magnetically accentuated far beyond their importance. On the other hand, deep-seated fissures tend to be depreciated and undervalued with respect to indications by residual fields not only because external magnetic indications of deep-lying fissures tend to be less pronounced than external magnetic indications of equally magnetized surface defects but also because the aforesaid magnetizing method necessarily applies longitudinal flux of somewhat lesser density to the lower rail levels.

In some cases, a given procedure of magnetization will result in fissures having substantially sharper external fields than superficial or non-fissure defects and therefore the indicative voltage response of a suitably designed flux meter will be of greater magnitude for a fissure defect that lies relatively near the surface than for a superficial or non-fissure defect such as a wheel burn, especially if the flux meter incorporates two closely spaced longitudinal detector coils in series-opposition. But the magnitude of the differential between a surface defect and a sub-surface fissure diminishes with increasing depth of location of the fissure, and therefore one difficulty encountered is to distinguish between an external residual field indicating a non-fissure defect at the rail surface and an external residual field indicating a relatively deep-lying fissure. The non-fissure field may even cause a stronger detector response than the fissure field.

The present invention is directed to the general problem of providing a detecting method and a detecting apparatus for clearly and reliably distinguishing fissure defects at locations of various depth from non-fissure defects. In the past, this problem has been met usually by what may be termed a negative or subtractive approach in that the solution has involved differentiation by sacrificing available or potential indicative energy. For example, one prior concept is that of "cleaning" or "demagnetizing" the upper side of the rail after initial longitudinal magnetization and prior to the detecting operation, thereby reducing longitudinal polarization of defects to limited depth in the rail. This step may be so effective as to substantially erase the local residual fields of surface defects but always at the cost of materially reducing the strength of residual fields at fissure defects relatively near the rail surface. As a result of such a subtractive treatment, the indications of fissure defects by a properly designed flux meter will be more conspicuous relatively but nevertheless will be of reduced magnitude. An advantage, of course, is that the demagnetization, if properly restricted, may not affect the polarization of deep-lying fissures materially and therefore may favor prominence of indications of deep-lying fissures without reduction in magnitude.

Another prior art concept is that of designing a flux meter with a high threshold of response to reject or ignore all external magnetic indications below a predetermined minimum strength. This concept is advantageous and does mark progress towards clearly distinguishing fissure defects from non-fissure defects. Like the first concept, however, it achieves differentiation or increases in relative values only at the cost of decrease in absolute values and cuts the net response of the flux meter to undesirably low energy levels.

The present invention represents more of a positive approach to the general problem in that it attains increase in differentiation, i. e., increase in relative values, without corresponding reduction in the magnitude of fissure indications. The invention involves various novel concepts.

One basic concept is that deep-lying longitudinal residual flux may by a suitable procedure be actually redistributed toward the rail surface. Under certain favorable circumstances the redistribution makes manifest internal fissures that are not appreciable externally prior to the redistribution.

A second concept involved is that the near-surface portion of a railhead may be subject to magnetic flux that is strong enough to adequately polarize near-surface fissures for subsequent clear detection but not so strong as to substantially polarize exceptionally hard material constituting wheel burns, scales, dents, and certain hardened inclusions. In other words, this second concept is that flux of relatively low density, especially if predominantly longitudinal of the rail, will act selectively to substantially polarize near-surface fissures without equally polarizing certain troublesome superficial defects. The significance of longitudinal flux as distinguished from lateral or vertical flux is that dangerous fissures have transverse components and therefore tend to be strongly polarized by longitudinal flux whereas non-fissure defects are generally horizontal and therefore affected to lesser degree.

A third concept is that, fortuitously, flux for the selective effect may be provided by carrying out the first concept of redistributing upward the deep level residual longitudinal flux. Thus the operation of distributing upwardly deep lying longitudinal residual flux may not only favor the discovery of deep-lying fissures but also selectively polarize the upper level fissures as distinguished from surface and near-surface non-fissure defects.

Since selective polarization of fissures is so greatly favored by longitudinal flux, the ideal would be to produce purely longitudinal flux orientation with no transverse or vertical flux whatsoever. In practice, however, the application of longitudinal flux to a rail from an external source inescapably involves incidental transverse flux since the lines of magnetic force must enter and leave the rail. An important feature of polarizing fissures by the mere shifting of longitudinal residual flux is that little or no incidental lateral flux is involved; hence the highly selective effect.

In practicing the invention in accord with this third concept, it is contemplated that the rail will be brought to what may be conveniently termed a requisite magnetic state in which substantial longitudinal flux by residual magnetism exists in the deeper levels of the rail but no substantial longitudinal flux exists near the upper rail surface. In this requisite magnetic state, the upper portion of the rail may, for the purpose of the present disclosure, be aptly described as "demagnetized" with respect to longitudinal magnetism. Actual absence of magnetization is not necessary because we have in mind the use of a detector designed primarily for response to flux fields created by longitudinal magnetization and therefore for our purpose the upper rail portion may either be actually demagnetized or may merely be magnetized in a transverse plane.

We have found that this requisite magnetic state of the rail may be attained by various procedures. For example, properly applying initial magnetizing electromagnets of suitable design to lower levels of the rail instead of to the upper surface may create the desired deep-lying residual longitudinal flux with no material longitudinal magnetic effect on the upper level of the rail.

An important advantage of our invention is that our new concepts may be profitably combined with either or both of the two previously mentioned prior art concepts, namely the prior concept of employing the cleaner or demagnetizing step and the prior art concept of ignoring or cutting off low energy indications.

In our preferred practice, we incorporate the cleaner step and a feature of prime importance is the employment of the cleaner step not only for its original purpose of demagnetizing surface defects but also and simultaneously for the additional purpose of transforming a conventionally magnetized rail into the above described requisite state in preparation for redistribution of deep-lying longitudinal residual magentism.

It will be readily appreciated that our preferred practice compensates for any negative or penalizing effect of the cleaning step. Even if the cleaning or demagnetizing step completely eliminates the polarization by longitudinal flux of near-surface fissures, the subsequent redistribution upwards of the low level residual longitudinal flux restores polarization of the near-surface fissures substantially, if not wholly, and thus avoids the heretofore inescapable penalty of seriously reducing the magnitude of detector response to near-surface fissures.

Heretofore the discarding of indicating impulses below a predetermined magnitude has meant sacrificing a substantial portion of the available strength of fissure indications. In fact, the use of a high threshold detector in conjunction with the cleaning step has up to now meant two successive reductions in the available energy for indicating the presence of a fissure located near the rail surface or at moderate depth, the first reduction being the loss of available energy caused by the surface demagnetization of the rail and the second reduction being the sacrifice of values below the level of responsiveness of the detector. In our new practice, the residual fields of upper level fissure defects are so effectively restored that the magnitude of the threshold adjustment of the detector is small in proportion to the magnitude of the fissure fields and therefore substantially no manifestations of upper level fissures are cut off by the high threshold setting of the detector.

The preferred practice of our invention is further characterized by the concept of causing the longitudinal flux to be redistributed upwardly by simply moving along the surface of the rail a medium of relatively low magnetic reluctance such as a simple mass of iron or other ferromagnetic material which presents a relatively broad face to the rail.

Other objects and advantages of our invention as well as other novel concepts with special reference to the cleaning or demagnetizing step will be apparent in our following description taken with the accompanying drawings.

In the drawings, which are to be regarded as merely illustrative,

Figure 1:
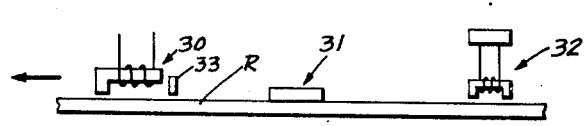
Figs. 1-3 are diagrams representing forms of what may be termed our basic combination.
Figure 2:
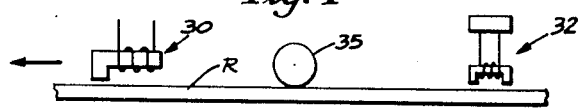
Figure 3:
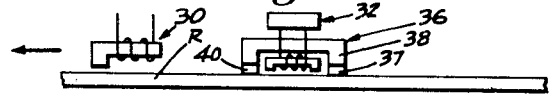

What may be termed the basic combination underlying our invention is shown diagrammatically in various forms in Figs. 1, 2, and 3. In Fig. 1, the three essential elements are, first, a means 30 for placing a rail R in a requisite state of residual longitudinal magnetism, second, a mass of ferromagnetic material 31 for movement along the rail in contact with the rail or slightly spaced therefrom to redistribute residual longitudinal flux therein and, third, a flux-responsive detector or flux meter 32. The means 30 in practice may and usually will comprise one or more devices for applying predominantly longitudinal flux to the rail R and at least one device for partially demagnetizing the rail. These three essential elements 30, 31 and 32 arranged in spaced relation, as indicated, may be parts of a flaw-detecting apparatus that is moved along the rail R in the direction indicated by the arrows. In some flaw-detecting procedures other than track testing, the required relative movement may be provided, of course, by maintaining the test apparatus stationary and moving the workpiece.

While the magnetizing means 30 is shown diagrammatically as L-shaped, such diagrammatic representation is to be taken as generic to represent any suitable means in the art to magnetize an elongated body longitudinally and leave the body with substantial longitudinal residual flux. Fig. 1 illustrates the fact that a magnetizing means 30 with an L-shaped core may be provided with a tailpiece 33 for a desirable demagnetizing effect as will be explained later.

Fig. 2 is similar to Fig. 1 but indicates that the ferromagnetic mass for redistributing the residual longitudinal flux may be in the form of a wheel 35 of magnetic material, such a wheel supporting the flaw-detecting apparatus. An iron wheel, however, has the disadvantage of undesirably concentrating vertical flux as it makes a line contact with the rail, and if the wheel has a steel rim, it will often impart magnetic spots to the rail.

Fig. 3 indicates that the required ferromagnetic mass may be in the form of a frame 36 spanning the flux meter 32, which frame, for example, may be a carriage for supporting and guiding the flux meter. The frame 36 is shown as comprising a rear shoe 37 of non-magnetic material combined with a U-shaped body 38 of magnetic material, the U-shaped body being provided with a forward magnetic shoe 40. The body 38 need not be U-shaped and need not be of magnetic material.

Figure 4:
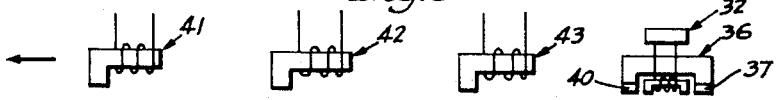
Figs. 4-7 are similar diagrams representing various specific practices of our invention.

In one practice of our invention, the basic combination as represented by any of Figs. 1, 2 and 3 is provided by an arrangement shown diagrammatically in Fig. 4. This arrangement includes three spaced L-type electromagnets 41, 42 and 43 in combination with the previously mentioned flux meter 32 and a ferromagnetic mass in the form of the previously mentioned frame 36. The general construction, and arrangement, of the three electromagnets 41, 42 and 43 are described in the Barnes and Keevil Patent 2,317,720 issued April 17, 1940, with special reference to what is designated therein as the improved form of the invention.

Figure 18:
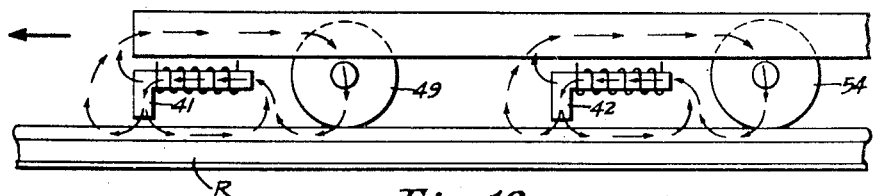
Fig. 18 is a diagrammatic view showing our preferred arrangement for initially magnetizing a rail.

The first two electromagnets 41 and 42 have a certain additive effect that may be accomplished only by successive magnetizations. The flux fields of the two successive magnetizations are shown diagrammatically in Fig. 18, a portion of the first flux circuit including a car-supporting wheel 49 and a portion of the second flux circuit in like manner including a car-supporting wheel 54.

This particular magnetizing method may be described as successively subjecting the body under test to energizing flux, substantially removing the energizing flux, subjecting the test body to another energizing flux and substantially removing the second energizing flux. From a slightly different viewpoint, the method may be described as subjecting the body under test to a varying magnetic flux having at least two high intensity periods with an intervening relatively low intensity period.

Patent 2,317,720 states that the third electromagnet 43 has utility in minimizing undesirable reverse longitudinal magnetism derived from stray flux and also states that the third electromagnet, in a sense, serves as a cleaner magnet for removing some of the magnetic spots that may have been introduced into the rail surface by the preceding electromagnets 41 and 42. In the practice of the present invention we prefer to emphasize the cleaner or surface-demagnetizing function of the third electromagnet 42 and therefore so construct and arrange the third electromagnet to favor vertical components of flux at the rail surface and to restrict the effective penetration of the demagnetizing flux to a shallow depth. The third electromagnet may aptly be termed a conditioning electromagnet. This aspect of the invention will be discussed more fully later.

Figure 5:
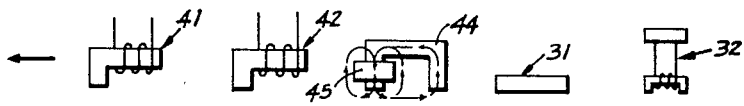
Figure 6:
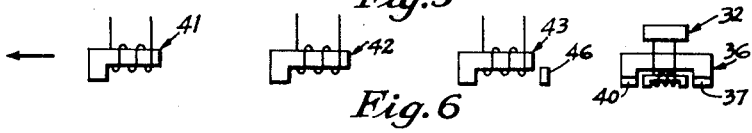
Figure 7:
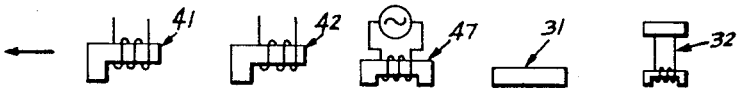

The purpose of Figs. 5, 6 and 7 is to indicate, by way of example, other possible arrangements embodying our basic concept.

In Fig. 5 a conditioning electromagnet 44 having a U-shaped core is substituted for the third electromagnet 43, and the previously mentioned block 31 of cast iron, tempered mild steel, or other suitable ferromagnetic material is substituted for the frame 36, the block being in front of the flux-responsive detector 32. It will be noted that the winding 45 of the electromagnet 44 is confined to the leading leg of the U-shaped core whereby vertical flux exists at the trailing leg of the core without the penalty of any trailing stray flux reducing the effect of the vertical flux.

Fig. 6 is similar to 4 but shows a tailpiece 46 associated with the third electromagnet 43.

Fig. 7 is similar to Fig. 5 but shows the third electromagnet as having a U-shaped core 47 with a central winding and as being energized by alternating current instead of the usual direct current.

The addition of the tailpiece 46 to the third electromagnet 43 indicated in Fig. 6 is only one of the many expedients that may be employed to suitably favor the conditioning of the rail. This expedient, however, may be of special interest and may throw some light on certain aspects of our invention.

The desired conditioning of the rail consists in reducing longitudinal magnetism at and near to the upper rail surface. The reduction in longitudinal magnetism may consist in actual demagnetization, i. e., changing the near surface portion of the rail to magnetically neutral state, or may consist of reorientation of the molecules to non-longitudinal polarization. Since it is contemplated that the detector means 32 will be selectively or primarily responsive to longitudinal flux, a shift in flux orientation from longitudinal to lateral or vertical is just as effective for the conditioning step as demagnetization in the strict sense.

Figure 9:
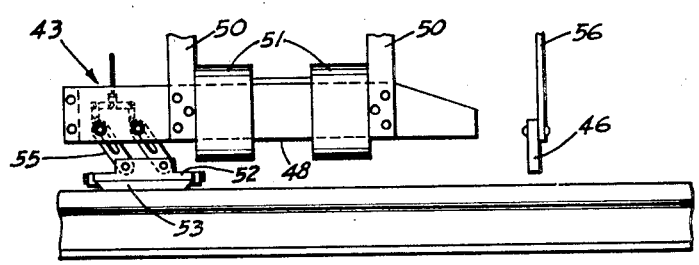
Fig. 9 is a side elevation of one form of conditioning unit that may be employed.

Fig. 9 shows by way of example how the third electromagnet 43 in combination with the tailpiece 46 may be constructed and arranged. A core 48 suspended from a test car (not shown) by a pair of non-magnetic brackets 50 carries a pair of spaced coils 51 and carries at its forward end a pole piece 52. The pole piece 52 has a replaceable non-magnetic wear shoe 53 and may be flexibly connected to the core by suitable links 55. The pole piece 52 and the links 55 are both of magnetic material and therefore comprise magnetically functional parts of the core 48. Suspended rearwardly of the electromagnet 43 by a suitable non-magnetic bracket 56 is the aforementioned tailpiece 46.

At present it appears that best results with the tailpiece or cleaner plate 46 are obtained if the tailpiece is approximately one inch thick and located about 6 inches to the rear of the electromagnet core 48 and about 5 inches below the top line of the electromagnet core, the bottom of the tailpiece being approximately 1⅛ inches above the rail surface.

Figure 19:
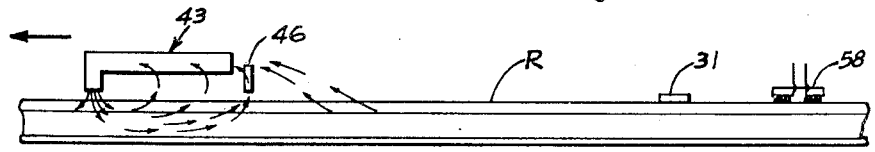
Fig. 19 is a similar view illustrating the action of one form of conditioner that may follow the initial magnetizing means.

Fig. 19 shows diagrammatically the electromagnet 43 with the accompanying tailpiece 46 moving along a rail R followed by a block 31 of ferromagnetic material and a pair of detector coils 58. There is reason to believe that the tailpiece 46 is effective for its purpose simply because it creates a concentration of vertical flux or flux normal to the rail surface by serving as a shunt to draw together the lines of force of the moving magnetic field created by the electromagnet 43. It will be noted that the concentration of vertical flux at the surface of the rail follows the main body of longitudinal flux created in the rail by the electromagnet 43 and therefore has a demagnetizing or reorienting effect on the resultant residual flux lying near the rail surface.

From Fig. 19 it is apparent that the proportion of the flux created by the electromagnet 43 that is concentrated and vertically oriented by the tailpiece 46 may be varied by varying the position and dimensions of the tailpiece. It is to be noted especially that spacing the tailpiece rearward from the electromagnet 43 permits a substantial amount of main flux to return directly to the electromagnet forward of the tailpiece and placing the upper end of the tailpiece substantially below the upper level of the electromagnet core permits substantial stray flux to return to the electromagnet from the rear over the top edge of the tailpiece instead of through the body of the tailpiece. While the relative effectiveness of the demagnetizing action to be accomplished in advance of the ferromagnetic mass 31 is not critical to a troublesome degree, nevertheless experimentation will reveal some optimum relative effectiveness for any given testing conditions and the tailplate expedient does lend itself to a wide range of adjustment.

An interesting fact is that after a block of mild steel has been moved in the usual direction to bring deep-lying longitudinal residual flux towards the surface and thereby created detectable or stronger detectable magnetic indications of defects and stronger fissure indications with respect to the indications of surface defects such as wheel burns, subsequent movement of the steel block in the opposite direction will reverse the relative strength of fissure and surface defect indications. In other words, after the steel block has made one traverse in the forward direction, movement of the flux meter along the rail will reveal fissure defects at least in some cases, more strongly than surface defects but if the mild steel block traverses the rail first forward and then rearward, subsequent movement of the flux meter along the rail will reveal the surface defects more strongly than the fissure defects.

Another striking fact is that the substitution of a shoe of magnetic material for the non-magnetic shoe 37 in Figs. 3 and 4 likewise results in the associated flux meter being less responsive to structural defects in the rail.

Figure 16:
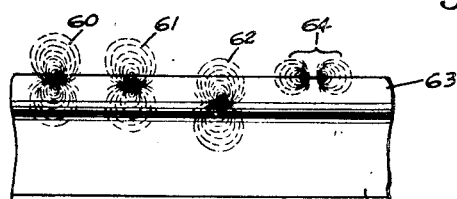
Fig. 16 is a diagram showing various patterns of external fields.

For the purpose of offering a possible explanation that is believed to have merit, we shall discuss first Fig. 16 and then Figs. 10–14.

Fig. 16, depicting a section of rail R, shows three flux patterns 60, 61 and 62 caused by strong longitudinal residual magnetization of three transverse fissures located at successive depths in the railhead 63 and shows a fourth flux pattern 64 of annular configuration in plan caused by strong longitudinal magnetism of a wheel burn or exceedingly hard scale on the surface of the rail.

Such flux patterns or external fields of something like the indicated relative magnitudes are created by simple longitudinal magnetism of substantial flux density, no conditioning step being carried out. Thus if we omit the third electromagnet 43 in the practice of the invention represented by Fig. 4 or omit the third electromagnet 44 in the practice of the invention represented by Fig. 5, or the third electromagnet 43 and the tailpiece in Fig. 6, or the third electromagnet 47 in Fig. 7, we find that transverse fissures at or relatively near the upper surface of the rail are relatively strongly polarized but that wheel burns are likewise relatively strongly polarized. The external field 60 may cause a flux meter response substantially greater than the external field 64 of the wheel burn but the magnitude of the field 61 of the somewhat deeper lying transverse fissure may be difficult to distinguish from the non-fissure field 64 and the external field 62 of the lowest located transverse fissure may be actually smaller in magnitude than the field 64.

If now the surface of the rail be treated to reorient the near surface molecules, the magnitudes of the three fissure fields 60, 61 and 62 will be reduced to appreciable degrees, especially the upper-level fields 60 and 61, and the magnitude of the superficial field 64 will be likewise reduced. Such change in relative magnitude may make it possible to clearly distinguish the flux meter response to field 61 from the flux meter response to field 64, but the magnitude of response to the field 62 may still be little or no greater than the magnitude of response to the superficial field 64. Under such conditions, raising the threshold of response of the flux meter to cut off at least a substantial proportion of the response to the superficial non-fissure field 64 will increase the prominence of the net response to the fissure fields 60 and 61 but may cause the deeper-lying fissure field 62 to escape detection entirely.

Figure 10:
Figs. 10-14 are diagrams illustrating a possible explanation for our results.
Figure 11:
Figure 12:

Figs. 10, 11 and 12 indicate what we believe happens when initial longitudinal magnetization of the rail is followed first by relatively drastic surface demagnetization and then the surface treatment by movement of a ferromagnetic mass along the rail.

Fig. 10 shows the hypothetical results of strongly longitudinally magnetizing a rail especially the upper levels of the rail body, for example, by passing our first two magnets 41 and 42 along the rail but not our third electromagnet. Fig. 10 shows two longitudinal series of arrows representing longitudinal magnetism in the railhead and two longitudinal series of arrows at lower levels representing deeper residual longitudinal flux. The resulting polarization of a transverse fissure 65 at a level in the longitudinal zone of the rail adjacent the rail surface creates a relatively strong external field 67 and the strong longitudinal flux also polarizes an exceedingly hard wheel burn 68 on the surface of the rail to create a residual annular field 70 of comparable strength.

When the third electromagnet has moved along the rail surface to achieve its conditioning effect, the longitudinal zone of the rail immediately adjacent the upper rail surface is magnetized substantially vertically as indicated in Fig. 11, the absence of longitudinal residual magnetism near the rail surface being indicated by the omission of the uppermost series of longitudinal arrows, leaving only one longitudinal series of arrows in the railhead. The small vertical arrows in Fig. 11 indicate vertical magnetism and suggest that the wheel burn 68 as well as the entire top surface of the rail is or may be relatively strongly magnetized vertically. In other words, the whole upper surface of the rail may constitute one pole face produced by vertical magnetization, the other pole face being the bottom of the rail. Since the contemplated flux meter is designed for selective response to longitudinal magnetism, it is apparent that movement of the flux meter at this stage along the rail of Fig. 11 would produce no indications of either the non-fissure defect 68 or of the fissure defect 65.

Fig. 11 represents what we term a requisite magnetic state of the rail, i. e., a state in which subsequent surface treatment by a ferromagnetic mass will have utility, and Fig. 12 indicates the result of moving the ferromagnetic mass along the rail shown in Fig. 11. For some reason, supposedly because of the additional upper paths of low reluctance offered by the ferromagnetic mass, movement of the mild steel block or equivalent medium causes the deep-lying longitudinal residual magnetism in the rail to be attracted upwardly and the shifted longitudinal flux is strong enough to have substantial polarizing effect on the fissure 65, the fissure being normal to the longitudinal flux, but has little or substantially no polarizing effect on the wheel burn 68, the wheel burn being parallel to the longitudinal flux.

In Fig. 12 the longitudinal series of arrows remaining in the lower portion of the railhead in Fig. 11 is shifted to a higher level near the surface of the rail to indicate the upward shift of the residual longitudinal magnetism into the longitudinal zone immediately adjacent the top surface of the rail. The transverse defect 65 is substantially polarized to produce the external field 69 but may not be polarized to the original degree of Fig. 10 as indicated by the showing of two flux lines in Fig. 12 as compared with the original three flux lines in Fig. 10.

Fig. 12 shows that the uppermost longitudinal arrows 71 are not so affected by the surface burn 68 as to cause appreciable response of our flux meter to the wheel burn 68. It is well known that one reason wheel burns tend to form strong external fields is that wheel burns commonly have small surface cracks that tend to polarize strongly. If the wheel burn 68 in Fig. 12 has such cracks, and the cracks have transverse components, polarization of the cracks by longitudinal flux may affect our flux meter. In any event, the response to the relatively strong fissure field 69 will be easily distinguished from any flux meter indication of the wheel burn 68.

The fundamental steps of the testing procedure represented in Figs. 10, 11 and 12 have been carried out in the laboratory and readings taken of what may be considered typical conditions. Purely by way of illustration, it has been found that under the conditions shown in Fig. 10, the fissure indication may be represented by a value of sixty-six units and the burn by a value of sixty units, but after conditioning the rail by first applying the demagnetizing step and subsequently passing the mild steel block over the rail, the fissure indication may have a unit value of sixty-two and the burn indication a unit value of forty. Obviously this increased spread between the fissure and burn indications greatly enhances the possibilities of locating fissures in track and distinguishing them from surface defects.

Figure 13:
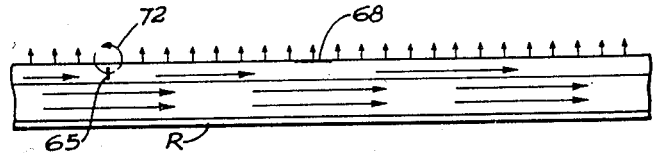
Figure 14:
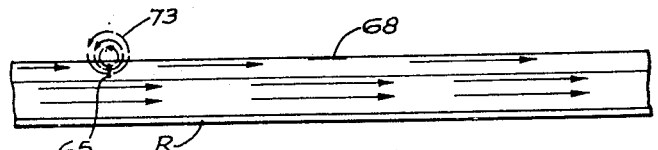

Figs. 13 and 14 indicate what is believed to happen when the rail of Fig. 10 is less severely demagnetized, i. e., demagnetized in such a restrained manner as to leave some degree of polarization by longitudinal magnetism in the longitudinal zone of the rail immediately adjacent to the top rail surface.

In Fig. 13 corresponding to Fig. 11, it will be noted that some longitudinal residual magnetism has been eliminated as again indicated by the omission of the top longitudinal series of arrows. The fissure field 67 of Fig. 10 is not in this case erased completely but is substantially reduced to result in the fissure field 72 in Fig. 13, as indicated by the showing of one flux line in Fig. 13 instead of the original three flux lines in Fig. 10. The non-fissure field 70 of Fig. 10 is, however, completely erased by complete depolarization of the wheel burn 68 with respect to longitudinal magnetism.

When the mild steel block or equivalent ferromagnetic medium is moved along the rail R in Fig. 13, it attracts the deep level longitudinal residual magnetism upward to subject both the fissure 65 and the wheel burn 68 to mild longitudinal flux as distinguished from the exceedingly strong original longitudinal flux applied by the two leading electromagnets 41 and 42. As the result of this introduction of low density longitudinal flux into the rail zone immediately adjacent the upper surface, the fissure 65, as distinguished from the non-fissure defect 68, is selectively repolarized as indicated in Fig. 14 by the showing of three flux lines in the final fissure field 73, the wheel burn not being appreciably polarized with respect to responsiveness of our flux meter. Thus the polarization of the fissure 65 has been restored to original strength but no detectable polarization of the wheel burn has been restored. Again the problem of distinguishing a fissure defect from a non-fissure defect has been met successfully.

Figure 15:
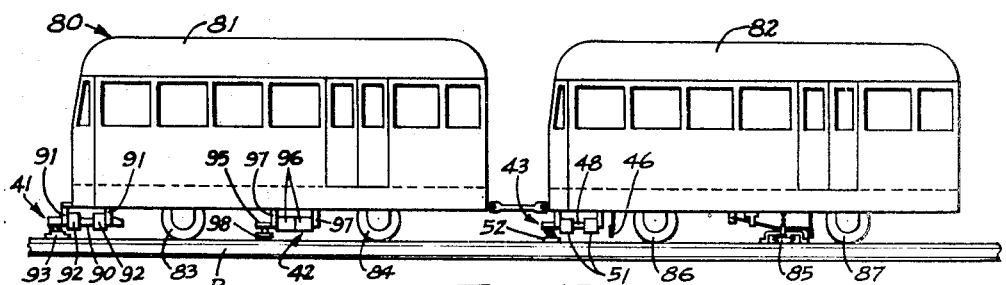
Fig. 15 is a side elevation of one form of rail-energizing and flaw-detecting equipment that may be employed in the practice of our invention.

The manner in which the arrangement represented by Fig. 6, for example, may be embodied in a detector car may be understood by reference to Fig. 15 and by reference to the previously mentioned Patent 2,317,720.

The detector car generally designated 80 in Fig. 15 comprises a leading section 81 and a trailing section 82, the former carrying the power equipment for operating the car and the latter carrying the equipment for recording the flaw indications received. The leading section is supported by front wheels 83 and rear wheels 84 and carries the previously mentioned electromagnet 41 in advance of the front wheels 83. The second electromagnet 42 is mounted between the front and rear wheels 83 and 84 and the third electromagnet 43 equipped with the tailpiece 46 is mounted on the front of the trailing section 82.

The detector unit 85 of the previously mentioned flux meter 32 and the previously mentioned associated frame or carriage 36 are mounted on the trailing section between the front and rear wheels 86 and 87 respectively of the trailing section. Preferably the front wheels 86 are of non-magnetic material or at least have tires of non-magnetic material.

The first electromagnet 41 comprises a core 90 suspended by non-magnetic brackets 91, the core carrying two spaced coils 92. A forward pole piece 93 is flexibly connected to the core and may be provided with a suitable wear shoe (not shown) for contact with the rail surface. The shoe, the pole piece and the flexible mounting means all are made of magnetic material to constitute functional parts of the core 90.

The second electromagnet 42 has a core 95 that carries two contiguous coils 96 and is supported by suitable non-magnetic brackets 97. A forward pole piece 98 is mounted on the core 95 for vertical adjustment, for example, by a pin and slot arrangement (not shown). The pole piece 98 may be provided with a cast iron shoe but in any event the pole piece and the vertical adjusting means will be of magnetic material to constitute functional parts of the core 90. Usually the pole piece 98 or the pole piece shoe will be maintained slightly spaced above the surface of the underlying rail.

The construction of the third electromagnet 43 is preferably the previously described construction shown in Fig. 9.

Figure 8:
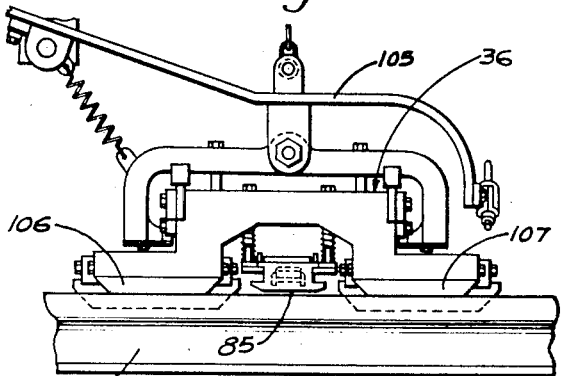
Fig. 8 is a view in side elevation of a metal carriage and associated detector unit that may be employed in the practice of the invention.

The manner in which the frame 36 and the associated detector unit are preferably constructed may be understood by referring to Fig. 8 and for specific details by referring to the Barnes and Keevil Patent 2,317,718 issued April 27, 1943.

In Fig. 8 the frame 36 is shown as a U-shaped yoke supported from the test car by an arm 105. The yoke is of magnetic material and has a replaceable forward wear shoe 106 of magnetic material and a replaceable rear wear shoe 107 of non-magnetic material. The detector unit 85 containing suitable detector coils is suitably suspended from the frame 36 between the two wear shoes. It is to be noted that the frame 36 not only serves as a carriage for supporting and guiding the coil unit 85 but also serves as the required ferromagnetic mass to redistribute deep-lying longitudinal magnetism in the rail prior to passage of the coil unit.

Figure 17:
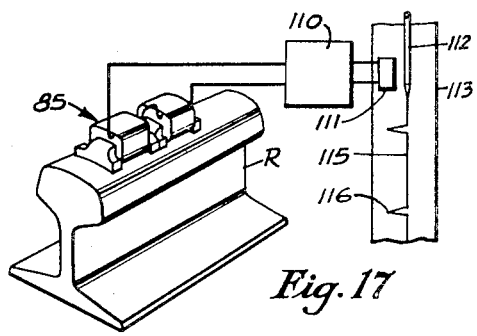
Fig. 17 is a view partly diagrammatic and partly in perspective representing a preferred form of detector apparatus.

In this preferred practice of our invention, it is contemplated that the detector unit 85 will comprise two coils as indicated in Fig. 17, the wire of the two coils being wound in opposition and connected in series to an amplifier 110. The output side of the amplifier 110 is connected to an electrically responsive means 111 for controlling a pen 112. The pen rests on a moving record tape 113 to trace a continuous line 115 thereon, the line being broken by peaks 116 representing rail flaws.

It is contemplated that the detector combination of Fig. 17 will be constructed in the manner specifically described in the copending Barnes and Keevil application Serial 482,526, filed April 10, 1943, now abandoned, with a threshold adjustment incorporated in the amplifier to eliminate response to external fields below a predetermined strength.

Figure 20:
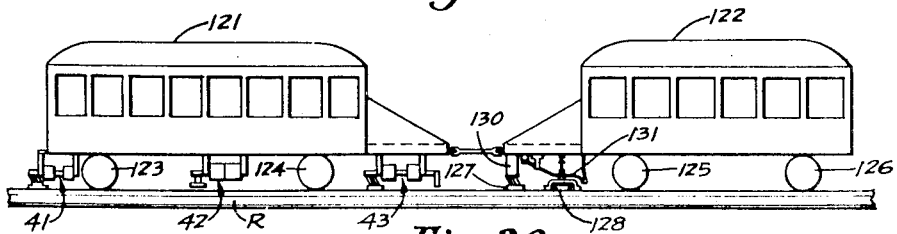
Fig. 20 is a view in side elevation of a second form of rail-energizing and flaw-detecting equipment.

An alternative form of detector car embodying our invention is shown in Fig. 20. This detector car comprises a leading section 121 and a trailing section 122, the former carrying the power equipment for operating the car and the latter carrying the equipment for recording flaw indications received by the detector. The leading section has front wheels 123 and rear wheels 124 and carries the electromagnet 41 in advance of the front wheels 123. The second electromagnet 42 is mounted between the front and rear wheels 123 and 124 and the third electromagnet 43 is carried by the leading section rearward of the rear wheels 124.

The trailing section 122 of the car is supported by front wheels 125 and rear wheels 126. Mounted on the trailing section 122, forward of the front wheels 125, is a ferromagnetic mass 127 followed by a detector unit 128. The ferromagnetic mass 127 may be in the form of a shoe of cast iron, or mild steel, or the like, flexibly connected by suitable means to a downwardly extending non-magnetic bracket 130. The detector unit 128 may be suspended and guided by a carriage 131 similar in construction to the previously described carriage 36 but made of non-magnetic material such as brass.

The underlying theory advanced herein to explain the results achieved is well supported by the evidence and is believed to be correct, but the invention is not to be regarded as limited by the statements of theory.

Since, under our basic concepts, various departures may be made from the methods and devices disclosed herein, our appended claims are to be construed as broadly as permitted by prior art.

We claim:

1. In the art of detecting defects in a ferromagnetic body by longitudinally magnetizing the body and subsequently exploring the space about the body for characteristic residual magnetism conditions in the vicinity of fissures, the improvement that consists of first magnetizing the body longitudinally and then prior to exploration reducing longitudinal residual flux for a shallow depth adjacent a surface of the body to at least substantially reduce on the corresponding side of the body external magnetic fields attributable to longitudinal magnetization and subsequently redistributing relatively deep-seated longitudinal residual magnetism towards said surface of the body prior to exploration and without vertical concentration of flux thereby to increase the magnitude of external fields of fissure defects relative to the magnitude of external fields of non-fissure defects.

2. In the art of detecting defects in a ferromagnetic body by longitudinally magnetizing the body and subsequently exploring the space about the body for characteristic residual magnetism conditions in the vicinity of fissures, the improvement that consists of first magnetizing the body longitudinally and then prior to exploration substantially reducing longitudinal residual flux for a shallow depth on one side of the body to at least substantially reduce on said side of the body external magnetic fields attributable to longitudinal magnetization and subsequently moving along said side of the body a ferromagnetic mass having a relatively flat area of substantial longitudinal dimension positioned adjacent to the body thereby to redistribute relatively deep-seated longitudinal magnetism towards the surface of the body prior to exploration to increase magnitude of external fields of fissure defects relative to the magnitude of the external fields of non-fissure defects.

3. In the art of detecting flaws in ferromagnetic bodies by residual magnetism, the method of magnetically conditioning a body for the detection of fissures having transverse components, said method including the steps of longitudinally magnetizing the ferromagnetic body to create an initial pattern of residual magnetism, moving along the body a magnetic field of a non-longitudinal pattern and of sufficient strength to substantially reduce external longitudinal magnetic indications of surface and near-surface fissure and non-fissure defects without substantially reducing relatively deep-seated residual magnetism in the body, and redistributing without vertical concentration of flux the relatively deep-seated longitudinal residual magnetism of the body towards the surface to produce a final pattern of residual magnetism with accentuated indications of fissure defects.

4. In the art of detecting flaws in ferromagnetic bodies by residual magnetism, the method of magnetically conditioning a body for the detection of fissures having transverse components, said method including the steps of longitudinally magnetizing the ferromagnetic body to create an initial pattern of residual magnetism, moving along the body a magnetic field of a pattern and strength to substantially reduce external longitudinal magnetic indications of surface and near-surface fissure arising from such longitudinal magnetization and non-fissure defects without substantially reducing relatively deep-seated residual magnetism in the body, and redistributing without vertical concentration of flux the relatively deep-seated longitudinal residual magnetism of the body towards the surface by moving along the surface of the body a medium of relatively low magnetic reluctance thereby producing a final pattern of residual magnetism with accentuated indications of fissure defects.

5. In the art of detecting flaws in ferromagnetic bodies by residual magnetism, the method of magnetically conditioning a body including the steps of bringing the body to a state in which longitudinal residual flux exists in longitudinal zones of the body substantially removed from a given longitudinal surface of the body and substantially no longitudinal residual flux exists in a longitudinal zone immediately adjacent said surface, and drawing sufficient longitudinal residual flux from said removed longitudinal zones to said adjacent longitudinal zone to substantially polarize fissures in said adjacent longitudinal zone without substantially polarizing hardened metal portions in said adjacent zones or on said surface and without producing vertical concentrations of flux.

6. In the art of detecting flaws in ferromagnetic bodies by residual magnetism, the method of magnetically conditioning a body including the steps of creating longitudinal residual flux in longitudinal zones of the body substantially removed from a given surface of the body with substantially no longitudinal polarizing residual magnetism in a longitudinal zone immediately adjacent said surface, and redistributing without vertical concentration of flux a sufficient proportion of said longitudinal flux toward said surface to substantially polarize fissures in said adjacent zone without substantially polarizing hardened metal portions in said adjacent zone or on said surface.

7. In the art of detecting flaws in ferromagnetic bodies by residual magnetism, the method of magnetically conditioning a body including the steps of bringing the body to a state in which longitudinal residual flux exists in longitudinal zones of the body substantially removed from a given surface of the body and substantially no longitudinal residual flux exists in a longitudinal zone immediately adjacent said surface, and introducing into said adjacent longitudinal zone sufficient longitudinal magnetic flux to substantially polarize fissures in said adjacent longitudinal zone without substantially polarizing hardened metal portions in said adjacent zone or on said surface and without producing vertical concentrations of flux.

8. In the art of detecting flaws in ferromagnetic bodies by residual magnetism, the method of magnetically conditioning a body for flaw detection including the steps of longitudinally magnetizing the body, substantially transversely magnetizing a longitudinal zone of the body adjacent one longitudinal surface thereof thereby to reduce polarization both of non-fissure defects on said surface and of fissure defects in said adjacent longitudinal zone by longitudinal residual magnetism, and introducing relatively low density longitudinal flux into said adjacent longitudinal zone to selectively restore polarization by longitudinal residual magnetism of fissure defects in said adjacent longitudinal zone.

9. In the art of detecting flaws in ferromagnetic bodies by residual magnetism, the method of magnetically conditioning a body for flaw detection including the steps of longitudinally magnetizing the body, substantially transversely magnetizing a longitudinal zone of the body adjacent one longitudinal surface thereof thereby to reduce polarization both of non-fissure defects on said surface and of fissure defects in said adjacent longitudinal zone by longitudinal residual magnetism, and diverting longitudinal residual flux into said adjacent longitudinal zone from longitudinal zones of the body more remote from said surface located laterally from said adjacent longitudinal zone to selectively restore polarization by longitudinal residual magnetism of fissure defects in said adjacent longitudinal zone.

10. In the art of detecting flaws in ferromagnetic bodies by residual magnetism, the method of magnetically conditioning a body for flaw detection including the steps of passing successive diverse magnetic fields along the body longitudinally thereof to bring the body to a state of residual magnetism in which a longitudinal portion of the body adjacent one surface thereof is predominantly non-longitudinally magnetized and longitudinal portions of the body more remote from said surface located laterally from said longitudinal portion are predominantly longitudinally magnetized, moving a ferromagnetic mass along said surface to divert longitudinal residual flux from said more remote zones into said adjacent zone to provide sufficient longitudinal flux therein to selectively polarize fissure defects as distinguished from non-fissure defects, said ferromagnetic mass having a relatively flat area of substantial longitudinal dimension positioned adjacent to the body.

11. In the art of detecting flaws in ferromagnetic bodies by residual magnetism, the method of magnetically conditioning an elongated body which consists in longitudinally magnetizing the body, then after the body has been thus magnetized and the magnetizing force removed, treating a longitudinal portion of the body adjacent a body surface to remove from said portion external longitudinal components of flux, and then causing the residual magnetism in other longitudinal portions of the body to extend its effect outwardly towards said longitudinal portion.

12. In the art of detecting flaws in ferromagnetic bodies by residual magnetism, the method of magnetically conditioning an elongated body which consists in applying a magnetizing force to longitudinally magnetize the body, treating a longitudinal portion of the body adjacent one surface to remove external vestiges of longitudinal flux, and then, after the body has been thus treated and the magnetizing force removed, causing the residual magnetism in the body to extend its effect outwardly towards the longitudinal portion thus treated.

13. In the art of detecting flaws in ferromagnetic bodies by residual magnetism, the method of magnetically conditioning an elongated body which consists in applying longitudinal flux to the body, again applying longitudinal flux to the body, surface-treating the body to remove external vestiges of longitudinal flux, and then after the body has been thus treated and the magnetizing force removed, causing the residual magnetism in the body to extend its effect outwardly towards the longitudinal portion of the body thus treated.

14. In the art of detecting flaws in ferromagnetic bodies by residual magnetism, the method of magnetically conditioning an elongated body which consists in applying longitudinal magnetic flux to the body, again applying longitudinal magnetic flux to the body but simultaneously shunting a portion of the flux outwardly along a surface of the body to set up a magnetic field along said surface normal thereto, and then after the body has been thus treated and the magnetizing force removed, causing the residual magnetism in the body to extend its effect outwardly towards the longitudinal portion thus treated.

15. In the art of detecting flaws in ferromagnetic bodies by residual magnetism, a method of magnetically conditioning a body for flaw detection including the steps of subjecting the body to a varying longitudinal magnetic flux having at least two high intensity periods with an intervening low intensity period to create an initial pattern of residual magnetism, moving along the body a magnetic field of a pattern and strength to substantially reduce external longitudinal magnetic indications of surface and near-surface fissure and non-fissure defects without substantially reducing relatively deep-seated residual magnetism in the body, and redistributing the relatively deep-seated longitudinal residual magnetism of the body towards the surface to produce a final pattern of residual magnetism with accentuated indications of fissure defects.

16. In apparatus for progressively detecting flaws in elongated ferromagnetic bodies, means to condition an elongated body with residual magnetism in advance of the detecting operation, said means comprising, in combination, magnetizing means movable longitudinally relative to said body to bring the body to a state in which longitudinal residual flux exists in longitudinal zones of the body substantially removed from a given surface of the body and relatively little polarizing longitudinal residual flux exists in a longitudinal zone immediately adjacent said surface, and a ferromagnetic mass having a flat area of substantial longitudinal dimension positioned adjacent to the body, and movable longitudinally relative to said body along said surface after said state is established, to draw sufficient longitudinal residual flux from said removed zones to said adjacent zone to polarize defects in said adjacent zone.

17. In apparatus for progressively detecting flaws in elongated ferromagnetic bodies, means to condition an elongated body with residual magnetism in advance of the detecting operation, said means comprising, in combination, means to magnetize said body in a substantially longitudinal manner, means subsequently to substantially demagnetize a portion of said body with respect to polarizing longitudinal magnetism in a longitudinal zone of limited depth adjacent one body surface, and a medium of low magnetic reluctance movable along said surface after said demagnetizing means to draw deep-lying longitudinal residual flux into said zone for polarization of defects therein.

18. In an apparatus for progressively detecting flaws in rails, means to condition a rail with magnetic flux in advance of the detecting operation, said conditioning means including a magnet for introducing flux longitudinally of the rail, said conditioning means also including a ferromagnetic mass out of contact with the rail and spaced rearward from said magnet to trail the magnet at a constant distance therefrom, said mass being adjacent to said rail and within the field of flux of the magnet.

19. In apparatus for progressively conditioning a rail with residual magnetism preparatory to testing it for latent flaws, the combination of a car movable along the rail, apparatus mounted on the car comprising first, second, and third rail conditioning means arranged for cooperation with the rail in the order named, said first means comprising a magnet adapted to longitudinally magnetize said rail to produce substantially longitudinal magnetism at various depths therein, said second means comprising an instrumentality for subjecting a zone of limited depth of the rail adjacent one surface thereof to non-longitudinal flux thereby to substantially depolarize structural defects in said zone with respect to longitudinal magnetism, and said third means comprising a medium of low magnetic reluctance in close proximity to said surface to draw deep-lying longitudinal residual flux into said zone for substantial repolarization of said defects with respect to longitudinal magnetism, said medium having a relatively flat area of substantial longitudinal dimension positioned adjacent to said rail.

20. In apparatus for progressively conditioning a rail with residual magnetism preparatory to testing it for latent flaws, the combination as set forth in claim 19 in which said second means comprises an electromagnet having a core at least a portion of which is positioned adjacent to said surface of the body with the longitudinal axis of the core portion directed transversely of the longitudinal axis of said rail.

21. In apparatus for progressively conditioning a rail with residual magnetism preparatory to testing it for latent flaws, the combination as set forth in claim 19 in which said second means comprises an electromagnet together with a magnetic shunt spaced from the magnet, said shunt being positioned to concentrate a portion of the electromagnetic flux in transverse orientation at said surface.

22. In apparatus for progressively conditioning a rail with residual magnetism preparatory to testing it for latent flaws, the combination of a car movable along the rail, apparatus mounted on the car comprising first, second, and third rail conditioning means arranged for cooperation with the rail in the order named, said first means comprising a magnet to longitudinally magnetize said rail, said second means comprising an electromagnet with a U-shaped core positioned longitudinally of the rail and adapted to substantially demagnetize said body with respect to polarizing longitudinal magnetism in a longitudinal zone of limited depth adjacent one surface thereof, the coil of said electromagnet being on the leading leg of the U-shaped core with respect to the direction of relative movement, and said third means comprising an instrumentality of low magnetic reluctance adapted to draw deep-lying longitudinal residual flux into said zone for polarization of latent defects therein.

WALTER C. BARNES.
HENRY W. KEEVIL.
JOHN C. DIONNE.

REFERENCES CITED

The following references are of record in the file of this patent:

UNITED STATES PATENTS

| Number | Name | Date |
|---|---|---|
| 2,218,784 | Billstein | Oct. 22, 1940 |
| 2,221,570 | Brace et al. | Nov. 12, 1940 |
| 2,223,371 | Keevil | Dec. 3, 1940 |
| 2,311,715 | Thorne | Feb. 23, 1943 |
| 2,317,718 | Barnes et al | Apr. 27, 1943 |
| 2,317,719 | Barnes et al. | Apr. 27, 1943 |